May 16, 1939.  W. M. BISHOP  2,158,492
UNDERSEA CABLE SYSTEM
Filed March 28, 1936  3 Sheets-Sheet 1
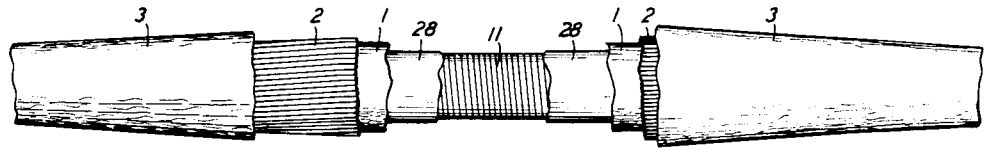
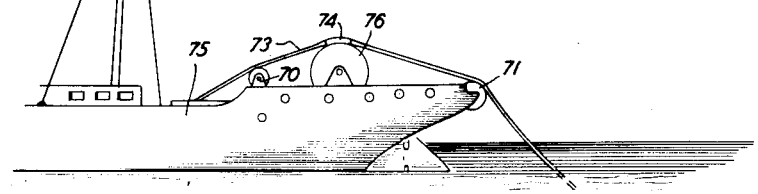
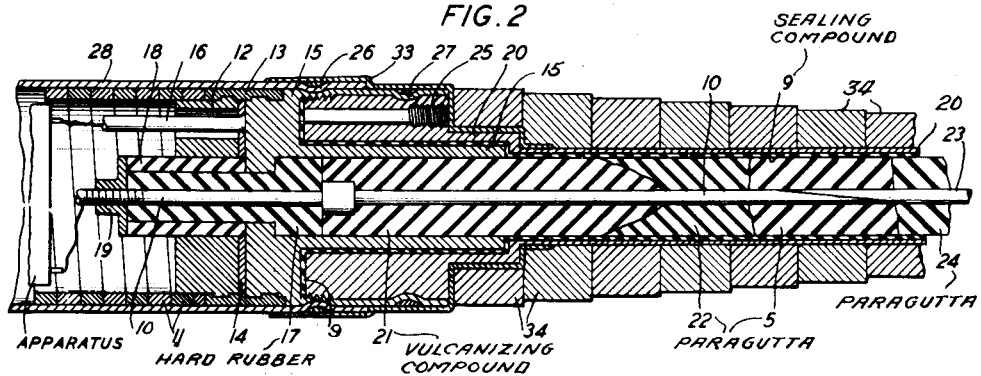
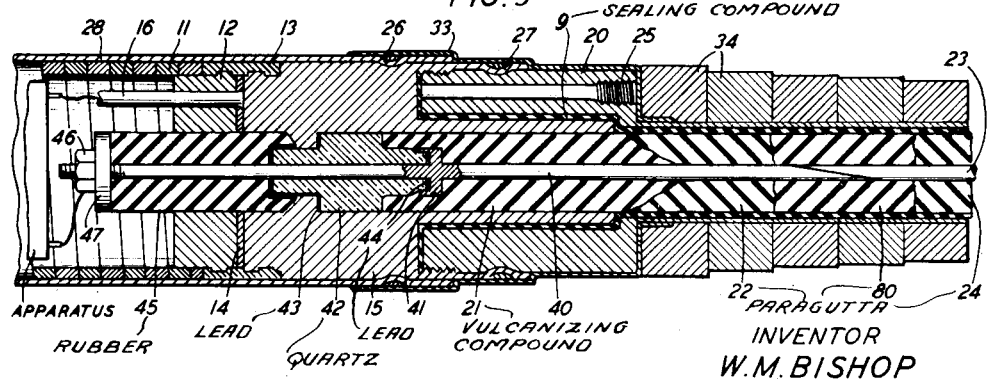
INVENTOR
W. M. BISHOP
BY
ATTORNEY May 16, 1939.  W. M. BISHOP  2,158,492
UNDERSEA CABLE SYSTEM
Filed March 28, 1936   3 Sheets-Sheet 2
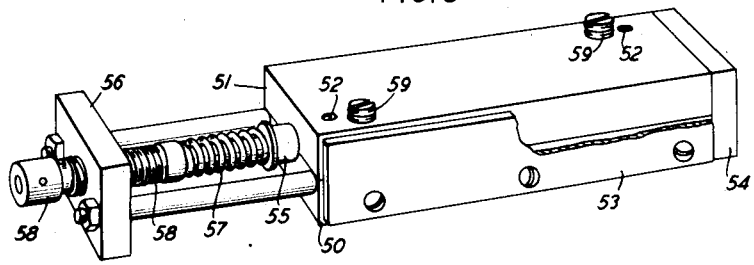
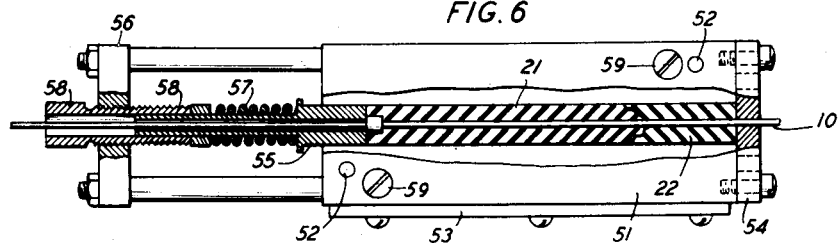
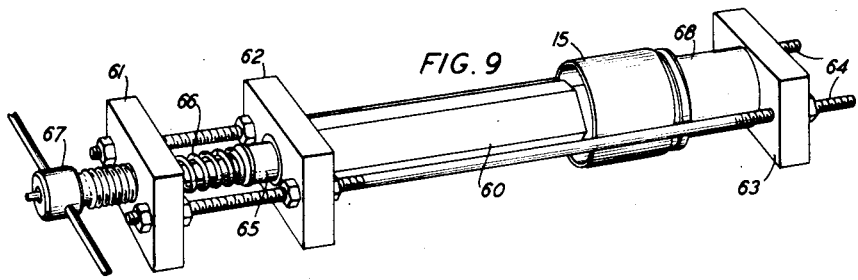
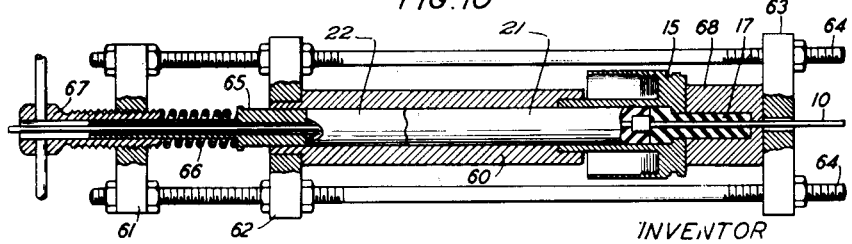
INVENTOR
W. M. BISHOP
BY
ATTORNEY May 16, 1939.  W. M. BISHOP  2,158,492
UNDERSEA CABLE SYSTEM
Filed March 28, 1936   3 Sheets-Sheet 3

INVENTOR
W.M. BISHOP
BY
*J.W. Schmid*
ATTORNEY

Patented May 16, 1939

2,158,492

UNITED STATES PATENT OFFICE 2,158,492

UNDERSEA CABLE SYSTEM

Walter M. Bishop, Huntington, N. Y., assignor to Bell Telephone Laboratories Incorporated, New York, N. Y., a corporation of New York Application March 28, 1936, Serial No. 71,411

10 Claims. (Cl. 174—70)

This invention relates to deep sea cable systems and more particularly to housings for apparatus employed in undersea cable systems.

The object of this invention is to house repeating and other apparatus in a container which is impervious to water and is not susceptible to corrosion.

Housings for apparatus employed in undersea communication systems must be impervious to water at both high and low pressures. The seal, particularly at the junction between the metal parts of the container, must be sufficient at all times to prevent the leakage of any water into the apparatus. In addition, no material corrosion of the metallic parts must be effected.

The housing in accordance with this invention possesses these necessary characteristics. The housing is preferably of the type disclosed and described in a copending application of J. F. Wentz, Serial No. 71,395, filed of even date herewith (Pat. 2,110,457, March 8, 1938). A flexible tubular container is provided in which electrical apparatus is inserted. A metallic plate having a groove therein is fixedly attached to the end of the container. A bushing which is impervious to water, such as quartz or glass, is inserted in the metallic plate. A lead or conductor passes through the bushing to the apparatus within the container. The container is covered with a metallic pliable material which also covers a portion of the plate including the groove, and is crimped into the groove. The junction between the plate and the covering is electroplated preferably with the same material as that of the covering to prevent corrosion.

A more comprehensive understanding of this invention is obtained by reference to the accompanying drawings in which:

Fig. 1 is a view of a housing, partly broken away, constructed in accordance with this invention;

Figs. 2 and 3 are sectional views of alternative forms of end seals for the housing shown in Fig. 1;

Fig. 4 shows the laying of a housing constructed in accordance with this invention, which is connected to a submarine cable;

Figs. 5, 6, 9 and 10 are views of molds employed in preparation of the seal for the housings shown in Figs. 2 and 3;

Figs. 7 and 8 are parts of the end seals shown in Figs. 2 and 3;

Figure 11:
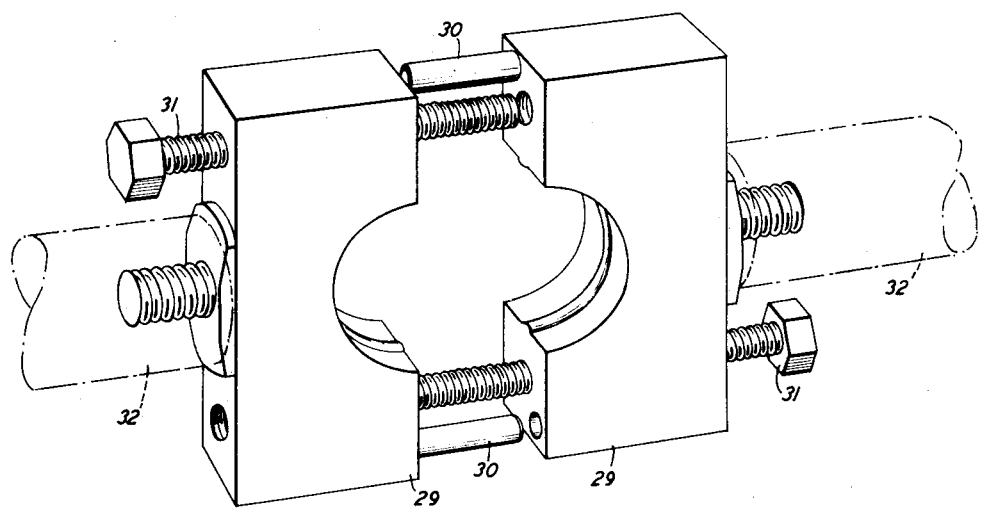
Figs. 11 and 12 are views of a tool employed in the construction of the end seals shown in Figs. 2 and 3.

Fig. 1 shows a housing with parts broken away and constructed in accordance with this invention. The housing comprises a helix 11 of steel or other material which is capable of withstanding deep sea pressures. A pliable copper jacket 28 covers the helix 11. The jacket 28 may be constructed of other material which is pliable and which will remain impervious to water. A layer of jute 1 is wound around the copper jacket 28. Over the jute, armor wire 2, similar to that employed on the submarine, cable is placed. Another layer of jute 3 is wound around the armor wire 2.

Figs. 2 and 3 show two different embodiments of the end seal or gland for the housing shown in Fig. 1. The end seal shown in Fig. 2 is fitted into the elongated steel helix 11 which is capable of withstanding deep sea pressures. A steel end plate 12 supports each end of the helix radially and resists the end thrust due to the undersea pressure. The helix supports the steel end plate 12 longitudinally by means of an internally threaded collar 13 which is fixedly held to the plate 12 by means of the threads thereof. A copper ground plate 14, held in contact with an outer brass conductor or connecting piece 15 by means of the internally threaded collar 13, has a terminal 16 fixedly attached thereto which passes through the end plate 12. The ground plate 14 is preferably soldered to the outer conductor 15. A central conductor 10 having a shoulder passes through the outer conductor 15, the ground plate 14 and the end plate 12. The central conductor 10 may be either solid or hollow. The central conductor 10 is insulated from the outer conductor 15, the ground plate 14 and the end plate 12 by means of a hard rubber insulator 17 having a shoulder. The shoulder of the conductor 10 rests against the insulator 17, while the shoulder of the insulator 17 rests against the outer conductor 15. The radial width of the shoulders of the insulator 17 and the conductor 10 must be sufficient to prevent appreciable extrusion of the insulator 17 through the outer conductor 15 and of the conductor 10 through the insulator 15, respectively when these are subjected to sea bottom pressures. The axial length of the shoulders of both the insulator 17 and the conductor 10 must be sufficiently great for the shoulders to withstand deep sea pressures without shearing. This construction and arrangement of the conductor 10 and the insulator 17 results in preventing leakage of water between the outer conductor 15 and the insulator 17. A nut 19, held rigidly by means of threads on the end of the conductor 10, holds the conductor 10 and insulator 17 to the outer conductor 15, with the aid of an insulator collar 18 which rests against the outer conductor 15. The central conductor 10 is separated from the outer conductor 15 by means of a vulcanizing compound 21 vulcanized to both conductors. The manner of vulcanizing the compound and its composition is described hereinafter in the consideration of Figs. 5 to 10.

Before vulcanization of the compound 21, paragutta or other suitable insulating material 22 is joined to the vulcanizing compound 21 at a point beyond the end of the outer conductor 15. Before laying the cable and housing the central conductor 10 is joined to a central conductor 23 of a submarine cable. Paragutta insulation 24 of the submarine cable is joined to the paragutta 22 surrounding the central conductor 10 by paragutta insulation 5. After the joining operation, a sleeve or end piece 20, having a long tube which surrounds the insulation of the central conductor 10 and a portion of the insulation surrounding the conductor 23 of the submarine cable, is inserted by means of threads into the outer conductor 15. The sleeve 20 is provided with a plug 25 for forcing a sealing compound 9 between the sleeve and insulation. The sealing compound 9, such as melted rubber or a viscous petroleum oil which is fluid at low temperature, is forced between the outer conductor 15 and the sleeve 20, the insulation 21 and 22 covering the central conductor 10 and the sleeve 20 in addition to the space between the sleeve and the insulations 24 and 5 covering the conductor 23 of the submarine cable which is surrounded by the sleeve 20. The outer conductor 15 and the sleeve 20 each have a groove 26 and 27, respectively in their outer surfaces. The jacket 28 comprising copper or other material which is pliable and impervious to water completely covers the steel helix 11. In addition, the jacket 28 covers the collar 13, which is brazed to the jacket 28, and extends over the outer conductor 15 beyond the point where the groove 26 of the outer conductor is located. Before the outer conductor is inserted in the jacket 28, the inside of the jacket 28 is tinned on the portion which covers the outer conductor. After the end plate 12, the ground plate 14 and outer conductor 15 have been inserted into the jacket 28, the end of the jacket is temporarily covered with a rubber sleeve to prevent entrance of water into the housing and the assembly is subjected to hydrostatic pressure. As a result of this procedure the jacket 28 is crimped into the groove 26 of the outer conductor.

Figure 12:
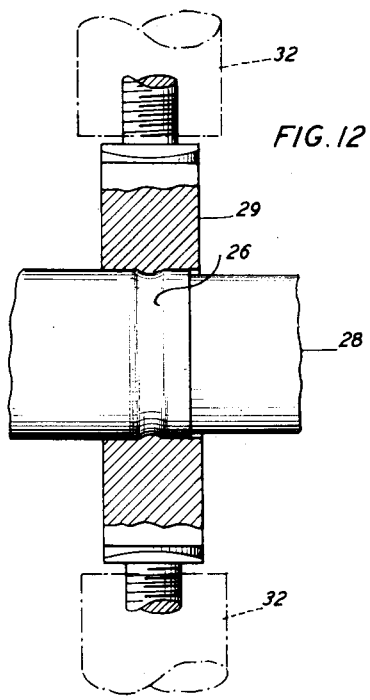

The jacket 28 is soldered to the outer conductor 15 at the point of the crimp 26 in the soldering tool shown in Figs. 11 and 12. The tool consists of two blocks 29 which, when closed with the aid of guides 30 and tightening screws 31, have the contour which is to be given to the jacket 28 at the point of the groove 26 of the outer conductor 15. The housing with jacket 28 is inserted in the tool and the screws 31 tightened to exert the desired pressure. Heat is applied to the plates 29 by means of two metallic cylindrical blocks 32. Preferably the plates 29 are heated before insertion of the jacket 28 in order that the operation may be performed quickly, thereby preventing any deleterious effect on the rubber insulation.

After the jacket 28 has been soldered to the outer conductor or connecting piece 15, the sleeve or end piece 20 is crimped at the point 27 by temporarily covering the assembly with a rubber tube and subjecting it to hydrostatic pressure. The outer conductor 15 and the sleeve are then soldered in a tool similar to that shown in Figs. 11 and 12 and in a manner identical with the soldering of the jacket to the outer conductor. The crimping of the jacket to the outer conductor and the crimping of the outer conductor to the sleeve insures the formation of a seal between the respective parts by means of the solder completely around the sleeve, outer conductor and jacket. As a further aid in preventing damage to the rubber part of the housing, a soft solder having a low melting point is preferably employed in the soldering operation. To prevent corrosion at the point of jointure of the jacket and sleeve with the outer conductor, the end portion of the jacket, the exposed portion of the outer conductor, and the sleeve are electroplated with the same metal which comprises the jacket and sleeve. The electroplating is represented in the drawings by the numeral 33. In addition to preventing corrosion, the electroplating 33 insures against leakage of water through the soldered joints. After electroplating a plurality of rings 34 are employed to produce a taper between the housing and the submarine cable. These rings are of gradually reduced diameter from that of the end of the housing to that of the submarine cable and are supported by the sleeve 20. One lead of the electrical apparatus, represented as a labeled block diagram in the drawings, contained within the housing is connected to the terminal 16 while the other lead is connected to the central conductor 10.

Fig. 3 shows another embodiment of an end seal or gland for the housing illustrated in Fig. 1. In Fig. 3, a quartz or glass bushing, which is impervious to water, is employed instead of the rubber insulator 17 shown in Fig. 2. The body of the housing, the end seal of which is shown in Fig. 3, is similar to that shown in Fig. 1. The housing consists of an elongated steel helix 11 each end of which is supported radially by a steel end plate 12. The steel helix 11 supports the steel end plate 12 against longitudinal thrusts due to sea pressure by means of an internally threaded sleeve 13 which is fixedly held to the end plate 12. A terminal 16 passes through the end plate 12 to provide a connection through a ground plate 14 to an outer conductor 15. The outer conductor 15 is fixedly held to the sleeve 13 and is brazed, soldered or welded to the ground plate 14. A central conductor 40 having a cup-shaped portion 41 passes through the outer conductor 15, ground plate 14 and end plate 12. The central conductor 40 is insulated from the outer conductor 15 by means of the quartz or glass insulator 42. Any other material which is substantially impervious to water, may be employed instead of glass or quartz for the bushing 42. Unlike the hard rubber bushing 17 shown in Fig. 2, the glass or quartz bushing 42 does not absorb any appreciable water and is not subject to diffusion of water. Accordingly, water does not pass through the bushing to the inside of the housing. The insulator 42 has a shoulder which is capable of resting on a lead washer 43 which is in contact with the outer conductor 15. The cup-shaped portion 41 of the central conductor 40 rests against a lead washer 44 which is supported longitudinally against sea pressure by the insulator 42. The central conductor 40 is insulated from the remaining portion of the outer conductor 15 by means of a vulcanizing compound 21. Before vulcanization of the compound 21 the central conductor extending beyond the outer conductor is covered with paragutta 22 in a manner to be hereinafter described. The compound 21 is vulcanized to the outer conductor 15 and the central conductor 40 and to the paragutta 22. A copper jacket 28 extends over the steel helix to a point beyond a groove 26 in the outer conductor 15. In a manner similar to that practiced in the construction of the housing shown in Fig. 2, the jacket 28 is crimped to the outer conductor 15 by means of hydrostatic pressure and soldered by means of the tools shown in Figs. 11 and 12. The central conductor 40 of the housing is joined with a conductor 23 of a submarine cable. Paragutta 80 is applied as a filler to complete the insulation between the insulation 24 of the cable and the paragutta 22 of the housing. A sleeve 20 is inserted in the outer conductor 15 by means of threads, after the housing has been joined to the submarine cable. The sleeve 20 extends over the paragutta insulation 22 and a portion of the insulation 24 of the central conductor 23. The sleeve 20 has a groove 27 therein for crimping of the outer conductor 15 to the sleeve. In addition the sleeve 20 is provided with a plug 25 by means of which a sealing compound which is fluid at low temperature may be inserted between the sleeve and outer conductor and the sleeve and the paragutta insulations 22, 80 and 24. The jacket 28 is crimped to the outer conductor at 26 and the outer conductor 15 is crimped to the sleeve 20 in the groove 27 in the same manner as the jacket and sleeve were crimped respectively to the outer conductor and sleeve of the housing shown in Fig. 2. The junction between the jacket 28 and the outer conductor 15, the exposed portion of the outer conductor and the junction between the outer conductor and sleeve are electroplated with the same material as that comprising the jacket and sleeve to prevent corrosion due to an electrocouple. The electroplating is represented by the numeral 33 in the drawings. In addition to preventing corrosion the electroplate 33 insures against the leakage of water through the soldered joints. To provide a taper between the end of the housing and the submarine cable a plurality of rings 34 of gradually diminished diameter from that of the end of the housing are supported by the sleeve 20.

To maintain the bushing 42 and other parts in position and to serve as a terminal for the apparatus contained within the housing, a cylindrical rubber bushing 45 is held firmly against the outer conductor 15 by means of a washer 47 and nut 46. One lead of the electrical apparatus, represented as a labeled block diagram on the drawings, and contained within the housing is connected to the terminal 16, while the other lead of the apparatus is connected to the central conductor 40 by means of the nut 46.

In Fig. 4, the laying of a submarine cable and the housing constructed in accordance with this invention is shown. In the laying of a cable for undersea communication, the cable usually passes over two sheaves and a drum. A cable 73 having a housing 74 constructed in accordance with this invention and connected to the cable passes over two sheaves 70 and 71 and a drum 76 located on a cable ship 75. The flexible nature of the housing permits the laying of the cable without the necessity of splicing of the cable on the cable ship for the connection of the housing.

Figs. 5 and 6 show the mold for preparing the seal comprising the compound 21 which is subsequently vulcanized to the conductor 10 and outer conductor 15. The mold consists of two halves or dies 50 and 51 which are aligned with each other by means of two guide pins 52. A steel plate 53 is fixedly attached to the lower half of the mold 50 to prevent loss of the insulating compound. Another steel plate 54 having an aperture therein through which the conductor 10 passes is fixedly attached to the lower half of the mold 50. A steel plunger 55 is inserted to engage the shoulder of the conductor 10. Pressure may be applied to the plunger 55 by means of a spring 57. The pressure is produced by the turning of a sleeve 58 which is concentric with the plunger 55 and threaded in a yoke 56. After molding the two halves of the mold 50 and 51 are separated by means of two screws 59 threaded through the upper half of the mold 51.

The conductor 10 shown in Fig. 7 is inserted in the mold shown in Figs. 5 and 6 with the shoulder portion of the conductor resting against the plunger 55. A composition of the vulcanizing compound which has been found satisfactory to produce the seal 21 is as follows:

| | Parts |
|---|---|
| Deresinated balata | 40 |
| Deproteinized rubber | 50 |
| Superla wax | 10 |
| Age rite resin (aldol-alpha-naphthylamine) | 1 |
| Zinc oxide | 50 |
| Captax (mercapto-benzo-theozole) | .5 |
| Stearic acid | .5 |
| Sulphur | 3 |
| Petrolatum | 5 |

The material known commercially as Superla wax and employed as an ingredient in the vulcanizing compound and the paragutta is a solid paraffin hydrocarbon wax derived from petroleum and having a melting point between 71 degrees and 77 degrees centigrade. A range of materials having somewhat higher and somewhat lower melting points are also satisfactory. Reference is made to U. S. patent to Wendt and Banta 1,735,555 granted on November 12, 1929, for a further description of such waxes and their modes of preparation.

The compound 21 is placed in the mold between the conductor and the plate 50 for a distance from the shoulder of conductor 10 which is slightly greater than the length of the outer conductor 15. At the other end of the mold paragutta 22 which comprises 40 parts deresinated balata, 50 parts deproteinized rubber and 10 parts of Superla wax is inserted. Preferably the compound and paragutta before being placed in the mold are cleaned with a cloth saturated with benzol to remove any discoloration which may have accumulated upon the compound. The upper half of the mold 51 is placed against the compound and the mold is inserted in a press, which previously had been heated to approximately 100° C., to exert a slight positive pressure. A slight pressure is maintained by frequent readjustment of the press during a ten minute heating period for the mold, compound and paragutta. At the end of ten minutes the mold is gradually closed and should be closed till the end of an additional five minute period. During this latter period at the first appearance of the compound on the side of the mold opposite the plate 53, the molding is temporarily terminated while the plate 53 is removed. This procedure permits the compound to flow in either direction as the mold is finally closed thus reducing disturbance of the compound around the central conductor 10.

As soon as the mold is closed steam employed to heat the press is turned off and cold water passed through the press to cool the mold. During the process of cooling the pressure of the press is gradually increased by compressing the spring 57.

After the mold has cooled the premolded but unvulcanized specimen as shown in Fig. 8 is withdrawn. It is subsequently vulcanized to the outer conductor 15 in the mold shown in Figs. 9 and 10.

The device for vulcanization shown in Figs. 9 and 10 comprises a hexagonal steel mold 60 the inside of which has a configuration similar to that of the end of the premolded specimen shown in Fig. 8. The mold 60 is adapted to fit on to the outer conductor 15. The outer conductor 15 and steel mold 60 are secured to each other by a clamp comprising two steel plates 62 and 63 held by two rods 64. The two rods 64 also support another plate 61. A plunger 65 is inserted in the interior of the mold 60 and causes pressure to be exerted on the seal during vulcanization. Pressure is produced on the plunger 65 by means of a spring 66 and a threaded sleeve 67. The sleeve 67 is threaded in the plate 61 and is concentric with the plunger 65. By turning the sleeve 67 pressure is applied to the plunger. A steel mold 68 is adapted to hold the end of the rubber insulator 17 of the housing which protrudes beyond the outer conductor 15.

The hard rubber insulator 17 is inserted in the outer conductor and the premolded specimen shown in Fig. 8 is inserted in the mold 60. The mold 60, the outer conductor 15 having the hard rubber bushing 17 inserted therein, and the mold 68 are clamped together by means of the plates 62 and 63. Pressure is applied to the plunger by the rotation of the sleeve 67 until a pressure of between 1500 and 3000 pounds per square inch is exerted on the seals 21 and 22. The device shown in Figs. 9 and 10 is then placed in an autoclave and the compound 21 cured for a period of thirty minutes at a temperature of approximately 142° C. (steam pressure of approximately 40 pounds per square inch). After curing, the device and seal are permitted to cool, pressure by means of the plunger being exerted during the cooling operation. After cooling, the seal, outer conductor and insulator 17 are removed from the mold. Compound 21 has now beeen vulcanized to the central conductor 10 and the outer conductor 15. The compound 21 for the seal for the housing shown in Fig. 3 is premolded and vulcanized to the central conductor 40 in the same manner as the seal shown in Fig. 8 is prepared for the housing shown in Fig. 2.

The outer conductor 15 and the central conductor 10 are cleaned before insertion in the molds shown in Figs. 5, 6, 9 and 10. The internal diameter of the bore through the outer conductor is made slightly undersize and is brought to size by forcing a steel ball having the desired diameter through the bore. This procedure results in an extremely smooth inner surface of the outer conductor. A similarly smooth surface is effected on the central conductor by rotating it while passing it through a plurality of steel balls or rollers under pressure. The smooth outer conductor and central conductor are thereafter made the anodes in an electrolytic bath of caustic soda maintained at a temperature of approximately 60° C. Electric current is passed through this solution for a period of approximately one minute. Subsequently the outer conductor and central conductor are washed with water to remove completely the caustic soda. The outer conductor and central conductor are then dipped in a solution of sodium cyanide for a period of three minutes. Both conductors are then washed in distilled water. Preferably, bristle brushes are employed in these washing operations. The conductors are then placed in a solution of absolute alcohol. The adhesion surfaces after the alcohol has dried are coated with a dispersion of vulcanizing compound 21 in benzol and permitted to dry for a period of thirty minutes to two hours.

While preferred embodiments of this invention have been illustrated and described, various modifications therein may be made without departing from the scope of the appended claims.

What is claimed is:

1. An apparatus housing adapted for laying on the sea bottom, comprising an elongated tubular member, a substantially cylindrical end piece supported by each end of said member, each of said end pieces having a groove around the outer surface, and a pliable metallic covering extending over said member and a portion of each of said end pieces including said groove and crimped into said groove to form a seal therewith.

2. A housing in accordance with claim 1, in which said end pieces and said covering are joined by soldering and the junctions are electroplated with the same metal as that comprising said covering.

3. An apparatus housing adapted for laying on the sea bottom, comprising a steel helix, a metallic end piece having a shoulder portion for supporting one end of said helix and including an outer cylindrical portion having a groove therein, and a copper tube for covering said helix and extending over said cylindrical portion including said groove and crimped into said groove to form a seal therewith.

4. An apparatus housing adapted for laying on the sea bottom, comprising an elongated tubular member, an end piece joined to one end of said member, a pliable metal jacket extending over said member and a portion of said end piece, and means comprising electroplated metal for sealing the junction between said jacket and said end piece.

5. A flexible container for laying on the sea bottom, comprising a pliable, substantially cylindrical metal jacket and a steel helix for preventing collapse of said jacket under pressure, a water-impervious insulating seal for one end of said container for passing a conductor to apparatus within said container comprising an insulating bushing, a central conductor passing through said bushing and an outer conducting element concentric with said central conductor, having an outer substantially cylindrical surface with an annular groove therein, a steel end plate secured to said outer element and extending within said helix to support in a radial direction the end of said helix, said outer element being adapted for support in the axial direction by the end of said helix, said metal jacket extending beyond the end of said helix into engagement with said cylindrical surface and being crimped into said groove and soldered to said cylindrical surface to form an impervious annular seal therewith, an electroplating applied annularly over the exposed area of the soldered junction between said jacket and outer element and of the same metal as said jacket to prevent corrosion of said jacket, and said bushing forming a seal impervious to water between said conductor and said outer element.

6. A flexible container for laying on the sea bottom, comprising a pliable substantially cylindrical metal jacket and a steel helix for preventing collapse of said jacket under pressure, a substantially water-impervious insulating seal for one end of said container for passing a conductor to apparatus within said container comprising a rigid insulating bushing, a central conductor passing through said bushing and having a shoulder in substantially water-tight engagement therewith, an outer conducting element concentric with said central conductor, having a surface in substantially water-tight engagement with said bushing to receive axially directed pressure therefrom and having an outer substantially cylindrical surface with an annular groove therein, a steel end plate secured to said outer element and extending within said helix to support radially the end of said helix, said outer element being adapted for support axially by the end of said helix, said metal jacket extending beyond the end of said helix into engagement with said cylindrical surface and crimped into said groove and soldered to said cylindrical surface to form an impervious seal therewith, a metal layer electroplated annularly over the exposed area of the soldered junction between said jacket and outer element and of the same metal as said jacket to prevent corrosion of said jacket, and said bushing being of an insulating material substantially impervious to sea water and of sufficient rigidity to withstand sea bottom pressures without substantial extrusion.

7. A flexible container for laying on the sea bottom comprising a pliable metal jacket supported by an inner steel helix against pressure, a substantially water-impervious insulating seal for passing a conductor to the interior of said container, which comprises a rigid insulating bushing, a central conductor passing through said bushing and having a shoulder in substantially water-tight engagement therewith, an outer conducting element concentric with said central conductor, having a surface in substantially water-tight engagement with said bushing to receive axially directed pressure therefrom and adapted to be coaxially supported against the end of said helix and having an outer substantially cylindrical surface with an annular groove therein, said jacket extending beyond the end of said helix to be sealed to said cylindrical surface by soldering and by crimping into said groove and said bushing being of an insulating material substantially impervious to sea water and of sufficient rigidity to withstand sea bottom pressures without substantial extrusion.

8. A flexible apparatus container for insertion in and laying on the sea bottom with an electric cable which comprises an inner shell composed of an elongated steel helix and steel end plates fitted into said helix to radially support its ends against pressure; an outer impervious shell composed of a pliable cylindrical jacket of copper surrounding said helix and supported thereby against collapse and extending beyond its ends, an annular brass connecting piece fitted into each end of said cylindrical jacket, soldered thereto to form impervious annular seals therewith and supported axially against the ends of said helix, a copper end piece supported axially against and centered by each of said connecting pieces and soldered thereto to form impervious annular seals therewith, and a continuous annular copper seal formed by electroplating at each end of said outer shell and covering the exposed portions of said brass connecting pieces and their junctions with said cylindrical copper jacket and said copper end pieces to present toward the sea water a continuous copper surface for said container and its junctions with the cable, the soldered joints with said brass connecting pieces being further secured by a groove in one of the joined surfaces and crimping of the other element into the groove at each joint; and substantially impervious insulating glands including a connection from each cable conductor to the interior of said container each of said glands passing through aligned bores in one of said end plates, connecting pieces and end pieces and having a shoulder portion for axial support against one of said brass connecting pieces and for forming an impervious seal therewith under sea bottom pressure.

9. An apparatus housing for interconnecting two sections of cable, each having a central conductor and an outer concentric conductor separated by insulating material, said housing comprising an elongated tubular portion having an outer water-impervious jacket of the same metal as that of said concentric cable conductor, two end seals for sealing said tubular portion and for conductive connections from said central conductors to apparatus within said housing and from said concentric conductors to said jacket, each of said end seals including a central conducting member and an outer conducting member concentric with said central member and an insulating impervious seal between said members capable of withstanding deep sea pressures and adapted to be joined to said cable insulating material and a slidable water-impervious sleeve of the same metal as that of said concentric cable conductor adapted to slide over said cable insulating material and to cover the completed juncture between said cable insulating material and said insulating seal and to connect between said jacket and said concentric cable conductor, said seal having a cylindrical portion extending into the end of said tubular portion for radial support thereof, and having a shoulder portion for engagement with said tubular portion for axial support thereby, said outer conducting member being metallically sealed to said jacket, as by mechanical interlocking therewith and soldering, and said jacket being sealed to said sleeve by a layer of particles of the same metal as said concentric cable conductor, said particles forming a continuous water-impervious connecting layer overlapping said jacket and said sleeve, and being in direct intimate contact therewith, as by electroplating, to prevent corrosive action by sea water.

10. An apparatus housing for connection to a deep sea cable having a central conductor surrounded by a layer of an unvulcanized insulating compound and an external conductor substantially entirely surrounding said layer, said housing including an elongated tubular portion having an external tubular conducting member for connection to said external cable conductor and adapted for enclosing apparatus connected to said central cable conductor and said housing further including a water-impervious end piece for connecting said cable conductors to said apparatus and external conducting member, respectively, said end piece including a metallic body portion for connection to said tubular conducting member and having a central passage, said end piece further including a central conducting member extending from the interior of said housing through said passage and sufficiently beyond said metallic body portion to facilitate connection to the central cable conductor and an insulating sealing gland about said conducting member substantially filling said passage and protruding sufficiently beyond the exterior end of said passage to facilitate joining to the cable insulating compound, and an outer conducting sleeve surrounding the cable insulating compound for connection to the external cable conductor and extending over the protruding portion of said sealing gland for connection to said metallic body portion, and an outer metallic covering extending between and partly over said tubular conducting member and said conducting sleeve, said covering being formed of metallic particles in direct intimate contact with said tubular member and said sleeve and forming a continuous impervious and conductive seal between them free from corrosion due to sea water.

WALTER M. BISHOP.